United States Patent [19]

Chen

[11] 4,294,377
[45] Oct. 13, 1981

[54] CONSTANT PRESSURE COOKER AND FASTENER

[76] Inventor: Shin-I. Chen, No. 5, 102 La., Ho-Chiang St., Taipei, Taiwan

[21] Appl. No.: 130,341

[22] Filed: Mar. 14, 1980

[51] Int. Cl.³ .............................................. B65D 45/34
[52] U.S. Cl. .................................... 220/321; 220/320; 292/256.65
[58] Field of Search ....................... 220/320, 321, 319; 292/256.65, 256.69

[56] References Cited

U.S. PATENT DOCUMENTS

| | | | |
|---|---|---|---|
| 2,237,952 | 4/1941 | Smith | 220/321 |
| 3,029,724 | 4/1962 | Lee | 220/320 X |
| 3,204,811 | 9/1965 | Fine | 220/320 |

*Primary Examiner*—George T. Hall

*Attorney, Agent, or Firm*—Cushman, Darby & Cushman

[57] ABSTRACT

Disclosed herein is a constant pressure cooker which has a coupling steel ring attached to the peripheries of the cover of the cooker and the cooker body and there is an opening at the coupling ring so that an adjustment of the opening can adjust the tightness of the cooker in its application. The said coupling steel ring has a spring-band on its upper ring surface or the steel ring itself is made of elastic steel material so that whenever the pressure cooker is tightly sealed and the steam therein has reached its predetermined saturated pressure, there is a upper thrust force, then, the spring band at the coupling steel ring moves upwards or the elastic steel ring expands so that the saturated steam in the cooker is released and the steam pressure in the cooker keeps constant.

12 Claims, 23 Drawing Figures

U.S. Patent   Oct. 13, 1981   Sheet 1 of 8   4,294,377
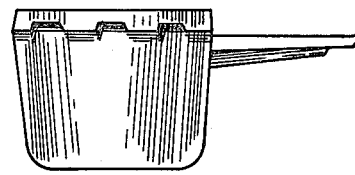
Fig. 1-A
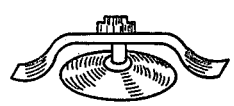
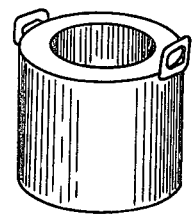
Fig. 1-B
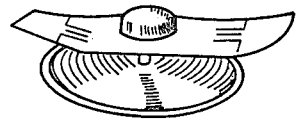
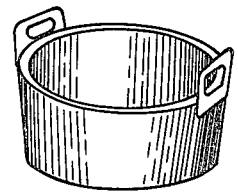
Fig. 1-C

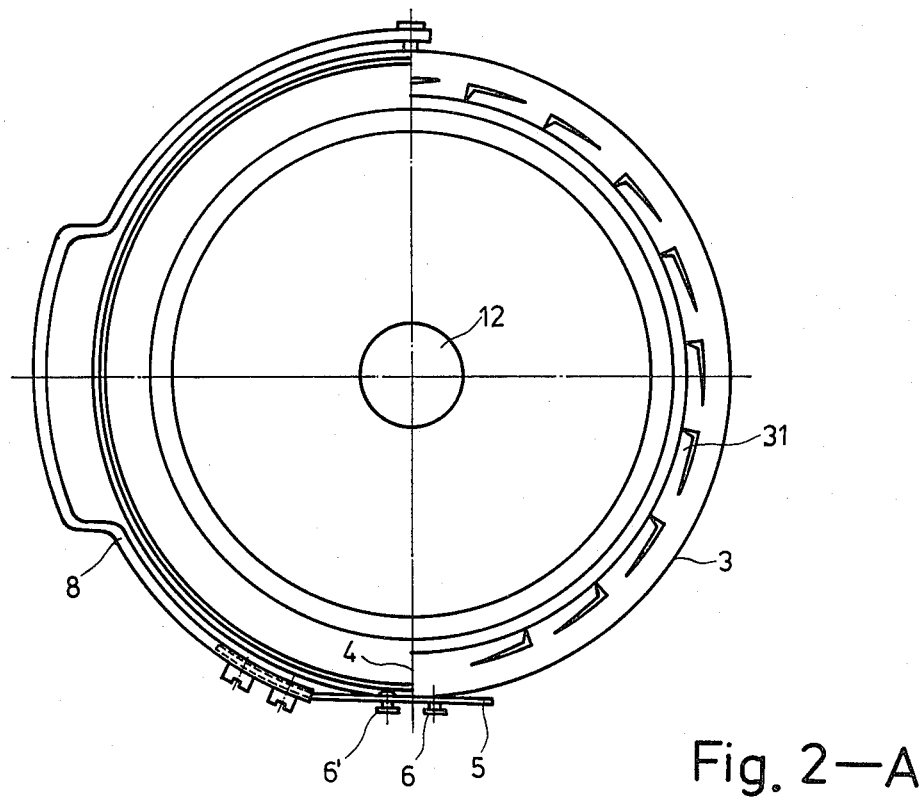
Fig. 2-A
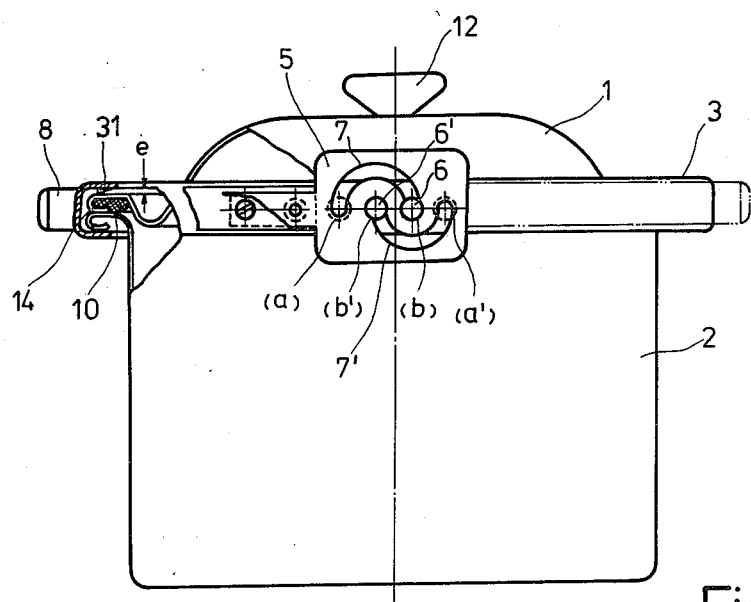
Fig. 2-B

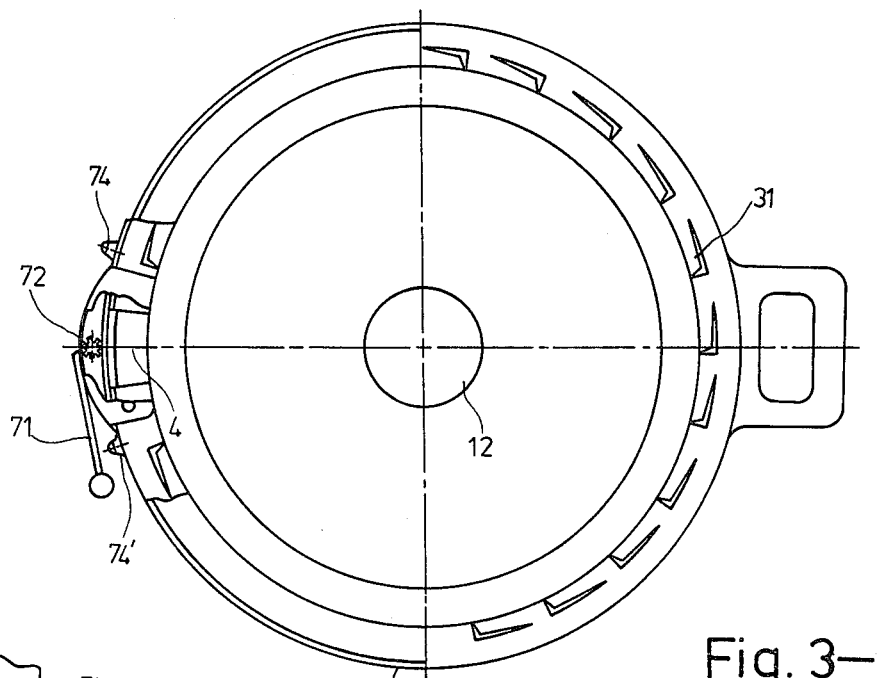
Fig. 3-A
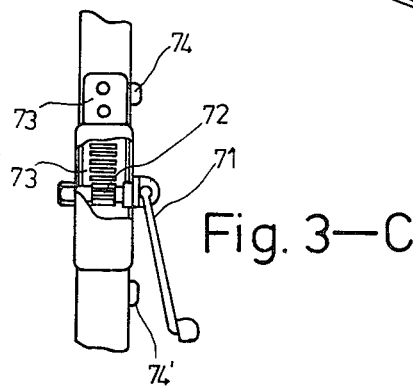
Fig. 3-C
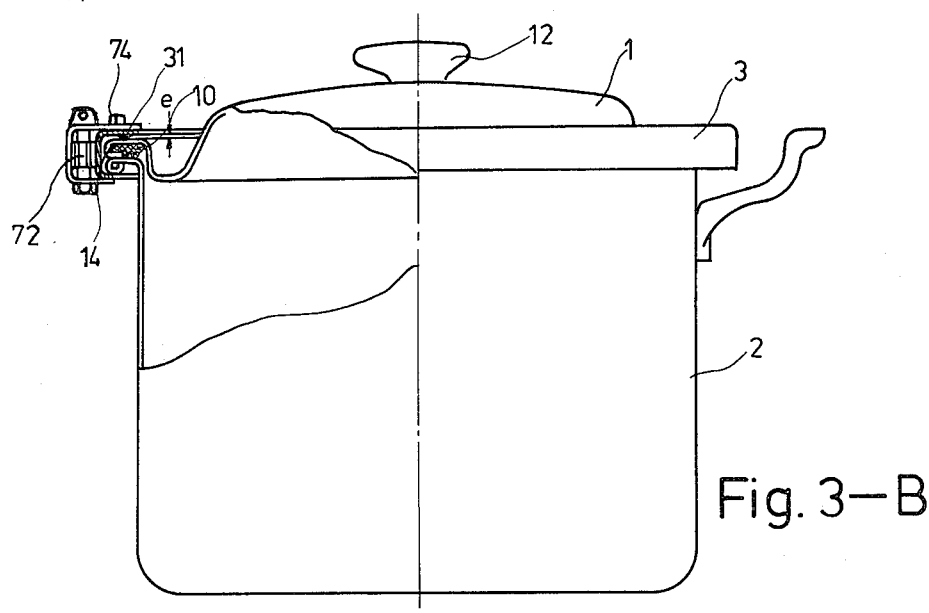
Fig. 3-B

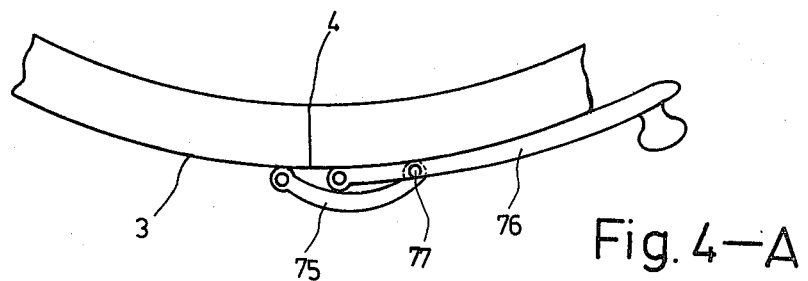
Fig. 4-A
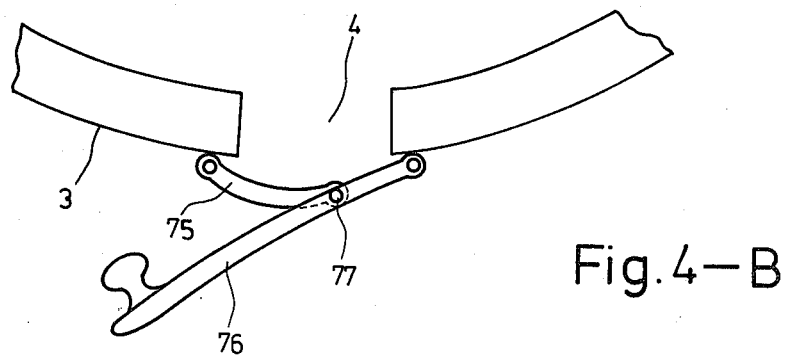
Fig. 4-B
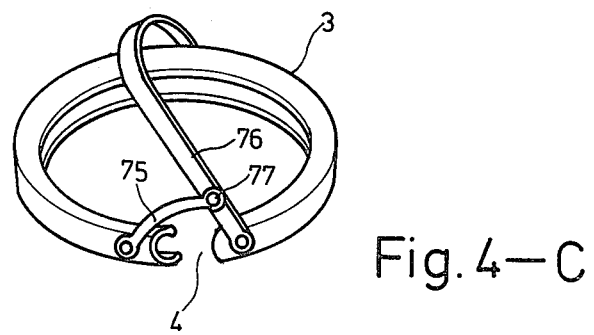
Fig. 4-C

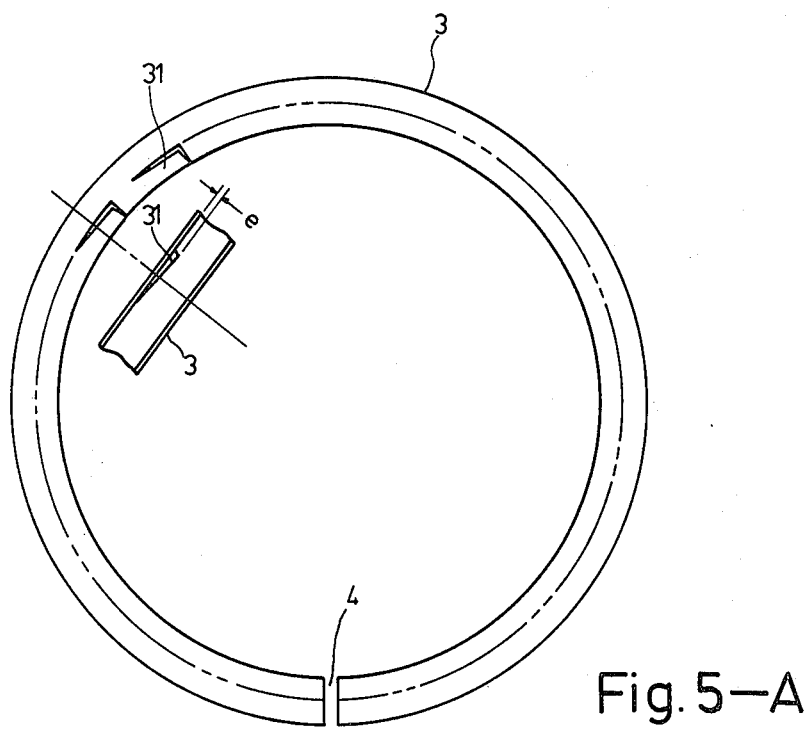
Fig.5-A
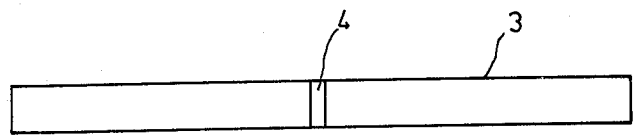
Fig.5-B

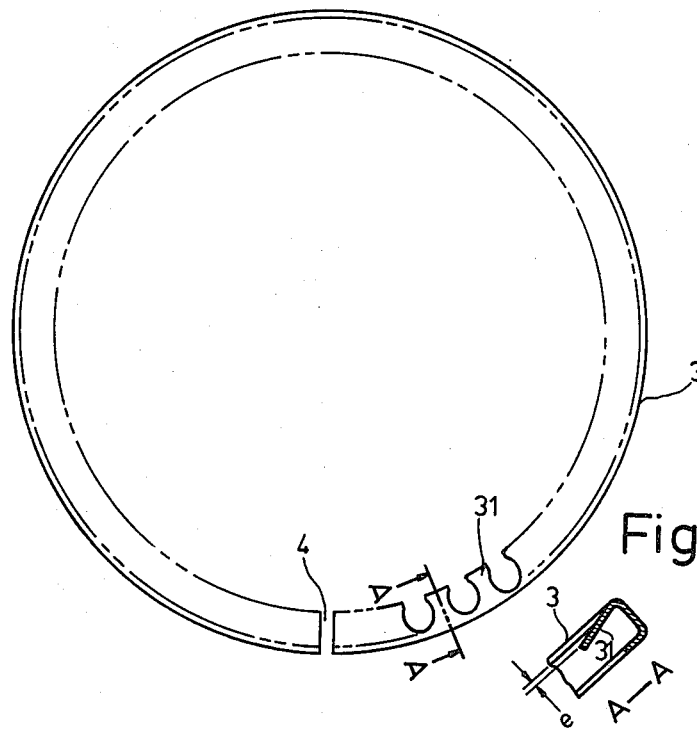
Fig. 6-A
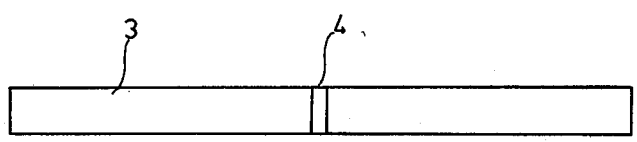
Fig. 6-B

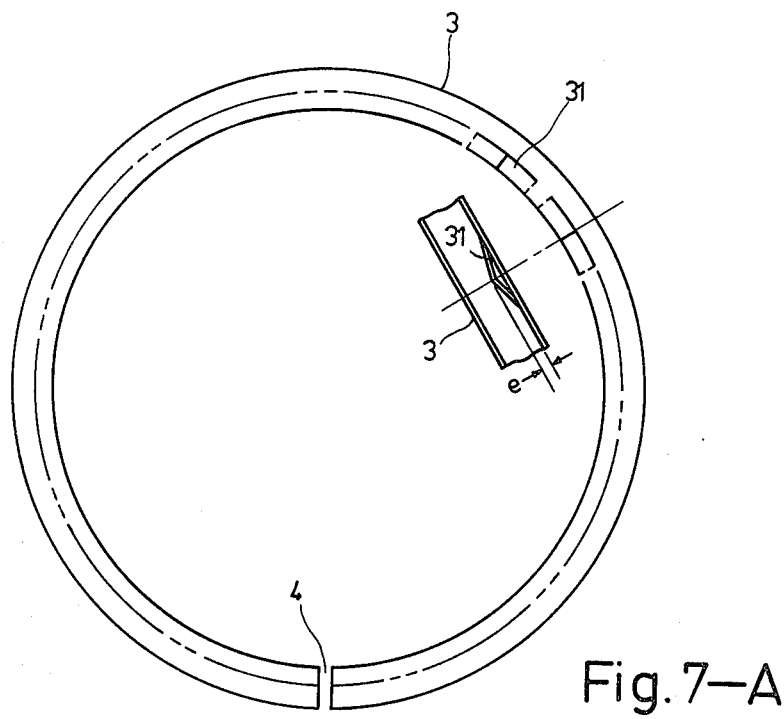
Fig.7-A
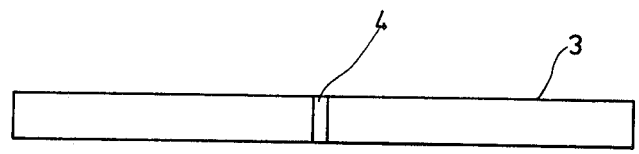
Fig.7-B

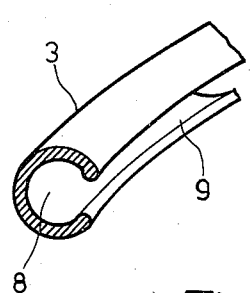
Fig. 8-A
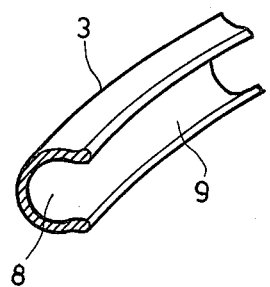
Fig. 8-B
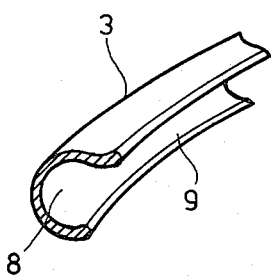
Fig. 8-C
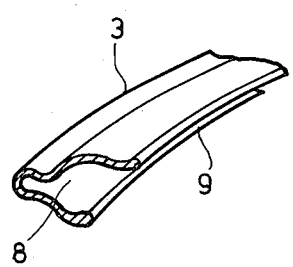
Fig. 8-D
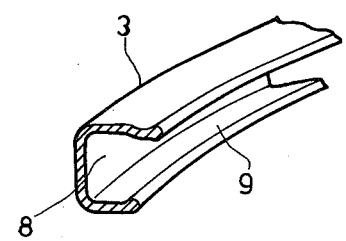
Fig. 8-E
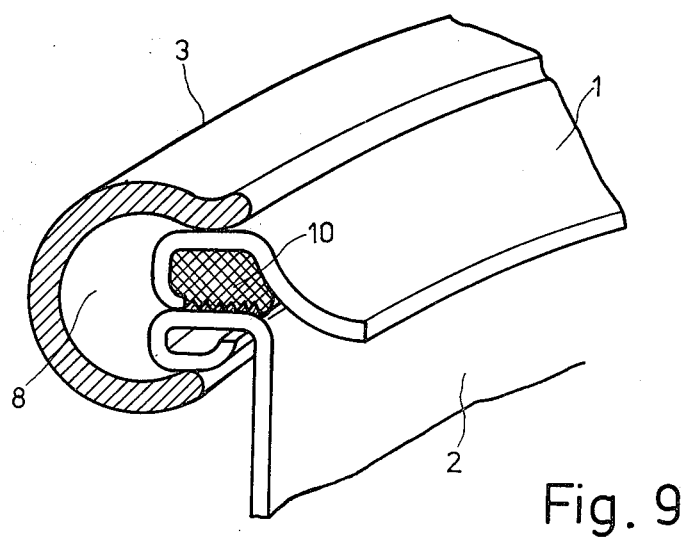
Fig. 9

CONSTANT PRESSURE COOKER AND FASTENER

BACKGROUND OF THE INVENTION

It is known there are three elements in the structure of a pressure cooker (steam pressure cooker): (1) High steam pressure resistant; (2) opening of cover is easy and there is a good air tightness and (3) appropriate pressure valve with a safety valve. When food to be cooked is placed in a pressure cooker and the cooker is heated up to an appropriate steam pressure, the rising of steam temperature raises the temperature of the food itself and thus, a lot of cooking time can be saved. Therefore, a pressure cooker should be high pressure resistant and thermal resistant. So, it should have a special structure and the question is, a pressure cooker should have a relatively large and heavy structure, and its application is difficult, and so on.

General house using pressure cooker has the following coupling arrangements Thread Coupling (as shown in FIG. 1 A); Latch Coupling (FIG. 1 B) and Oval Cover Coupling (FIG. 1 C). Both of them have the following common disadvantages: (1) Since a pressure cooker requires high pressure resistance with good air tightness, the complicated coupling makes application difficult and because of the limit in material and shape of cooker, production precess is difficult and the cost is high. (2) Such a pressure cooker uses air holes for pressure release, negligence in operation will clog the air hole and then, there is an extra high pressure in the cooker and there is even a risk of explosion. With such riskful disadvantages, even though pressure cookers are good kitchen utensils, consumers are hesitate to buy them and therefore, its popularity is affected.

SUMMARY OF THE INVENTION

The present invention "A Constant Pressure Cooker and Its Coupler" is provided to overcome and eliminate the above mentioned defects and it is characterized by the use of a coupling steel ring for coupling the cooker of the pressure cooker and the cooker body, which is entirely different from ordinary pressure cooker. Features of the invention are as follows:
(1) The cooker cover and the cooker body are coupled by means of the tightness of a coupling steel ring between them and, rightward and leftward movement of its handle or operation lever can loose or tighten the coupling steel ring. Therefore, anybody can use and operate it. Its handle can be used as a handle of the cooker and thus, the operation of such a pressure cooker is easy and convenient.
(2) The coupling steel ring can be removed and stored. Therefore, a pressure cooker can be used as an ordinary cooker or even has its coupling steel ring attached till the soup is boiled.
(3) Whenever the pressure in the pressure cooker reaches a saturated level, steam will be released automatically by means of the coupling steel ring. So there is no risk of explosion in application and user will feel safe in using the cooker.
(4) Whenever the pressure in the pressure cooker reaches a certain level, pressure releases automatically. Then, the metal material for making the cooker cover and cooker body might be any material with appropriate hardness. Enamel may be used for decorating the cover and the body since the steam will keep constant and there will never been any extra ordinary expansion which deteriorates the enamel.

BRIEF DESCRIPTION OF THE DRAWINGS

FIG. 1 A—An ordinary pressure cooker with thread coupling.
FIG. 1 B—An ordinary pressure cooker with latch coupling.
FIG. 1 C—An ordinary pressure cooker with oval cover.
FIG. 2 A—Top view of a coupling steel ring which applies it handle for tightening its opening.
FIG. 2 B—A front view of the coupling steel ring which applies its handle for tightening of its opening.
FIG. 3 A—A top view of the coupling steel ring which uses an operation lever to drive its gear for tightening of its opening.
FIG. 3 B—A front view of the coupling steel ring which uses an operation lever to drive its gear for tightening of its opening.
FIG. 3 C—Structure of the operation lever driven gear.
FIG. 4 A—A coupling steel ring which uses an operation lever and bar for closing of its opening.
FIG. 4 B—A coupling steel ring which uses an operation lever and bar for opening its opening.
FIG. 4 C—Operation lever of a coupling steel ring, which can be in the form of a handle.
FIG. 5 A—Top view of a coupling steel ring, showing a "L"-like spring band on its upper ring surface.
FIG. 5 B—Front view of a coupling steel ring, showing a "L"-like spring band on its upper ring surface.
FIG. 6 A—Top view of a coupling steel ring, showing a spring band of different shape.
FIG. 6 B—A front view of a coupling steel ring, showing a spring band of different shape on its upper ring surface.
FIG. 7 A—A top view of a coupling steel ring, showing a rectangular spring band on its upper ring surface.
FIG. 7 B—A front view of a coupling steel ring, showing a rectangular spring band on its upper ring surface.
FIG. 8 A, B, C, D, and E—Coupling steel rings made of different elastic steel material with different cross section.
FIG. 9—A coupling steel ring made of elastic steel material to be attached between a cooker cover and cooker body.

DESCRIPTION OF THE PREFERRED EMBODIMENT

As shown in the drawings, the cooker body (2) has a structure and shape similar to that of an ordinary cooker and its upper periphery is also similar to ordinary cooker, and therefore the use of a special process in the fabrication thereof is not necessary. The cover (1) has a structure similar to a cover for ordinary cooker but its external edge is curved inward to be a groove (14) for installing a thermal resistant rubber (10) as a packing against the cooker body (2). On the cover (1) there is a handle (12) which can be a shape of any kind to ease removing the cover (1). The coupling steel ring (3) has an opening (4) at its periphery and the width of the opening is about 2-3 cm. When the coupling steel ring (3) is at loose condition, its diameter is slightly larger than the outer diameter of the edge of the cooker body (2) and the cover (1). Therefore, the two edges of the cooker body (2) and the cover (1) can be fitted to the coupling steel ring (3). Tighten the opening (4), the diameter of the coupling steel ring (3) can be reduced and then the cooker body (2) and the cover (1) can be air tightened together. Suppose the opening (4) is 2.5 cm wide, then the diameter will be reduced by circumference/x=2.5/3.14 cm=0.8 cm, which is enough for the tightening the coupling. There are a plurality of way for tightening the opening (4). FIG. 2 shows an example. It uses two fixing pins (6) and (6') which are fixed to the coupling steel ring (3) at each side of the opening (4) respectively. Each end of the opening is fixed to groove (7) or (7') by means of fastener (5), which is connected to the handle (8). As shown by the broken line in the drawing, when the handle (8) is at the right side, the fixing pins (6) and (6') are at position (a) and (a') in the groove (7) and (7') respectively. Then, the coupling steel ring (3) is at its longest diameter condition. In other words, the coupling steel ring (3) is in freely removable condition. When the handle (8) is at the left side, the fixing pins (6) and (6') are at the positions (b) and (b') in the groove (7) and (7') respectively and both fixing pins (6) and (6') come to their nearest distance. Therefore, the diameter of the coupling steel ring (3) is minimized and the cooker body (2) is tightly coupled with the cover (1). So rightward and leftward movement of the handle (8) can open and close the cover (1). Operation is very simple. When the handle (8) is at the upright position it functions as a steam release but also a handle for the whole cooker, which eases the application. FIG. 3 shows another example of the coupling steel ring (3) which uses an operation lever (71) that drives a gear (72) coupling to a gear (73) at an end of the opening (4) to control the tightness of the coupling steel ring. Right and left turning of gear can adjust the tightness of the coupling steel ring. The opening and closing position of the operation lever (71) is controlled by the positioning grooves (74) and (74') at both end of the opening (4).

FIG. 4 shows another example of controlling the opening (4) of the coupling steel ring (3). FIG. 4 A shows the closing condition of the opening (4). FIG. 4 B shows its opening condition. There are a moveable bar (75) and an operation lever (76) at the end of the opening (4), and the bar (75) is pivotally connected to the operation lever (76) at pivot (77) so that the right and left movement of the operation lever can open and close the opening (4). As shown in FIG. 4 C, the operation lever (76) can be of a handle which can open and close the opening (4) through rightward and leftward movement.

The invention uses a coupling steel ring (3) to couple the cover (1) to the cooker body (2) tightly. Another feature of the invention is the handle (8) or operation lever (71) or (76) controls the extension of its diameter so that whenever there is an extra steam pressure in the cooker to be released, there is an upward thrust force at the cover (1) and then, the coupling steel ring (3) can have its diameter changed from its minimum diameter to it maximum diameter with a range of about 0.8 cm for the release of steam. On other words, the coupling steel ring (3) at its minimum diameter condition can tightly couple the cooker cover (1) to the cooker body (2) and has its diameter extended for release of steam from the cooker. When it is at the maximum diameter condition, steam pressure has been lowered and the cover can be opened freely. Therefore, the pressure cooker as disclosed herein can be opened regardless of its interior steam pressure so that the application is not riskful.

The coupling steel ring (3) has a spring band (31) on its upper ring surface or it is made of elastic steel material itself.

The said coupling steel ring (3) with a spring band (31) has a "[" cross section, while the spring band (31) is directly pressed on the upper ring surface of the coupling steel ring (3). The spring band can be of any shape, such as that shown in FIGS. 5 and 6. It can be of "L" shape and arch shape or any other shape. An end of the spring band (31) is connected to the coupling steel ring (3) while its other end is pressed down to maintain a gap (e) with the upper edge of the coupling steel ring (3). FIG. 7 shows a rectangular spring band (31) which has its longer side connected to the coupling steel ring (3) directly while its middle part is concaved to maintain a gap (e) with the upper edge of the coupling steel ring (3). The spring band can resist a pressure equivalent to the designed steam pressure in the pressure cooker. When the coupling steel ring (3) tightly couple the cover (1) to the cooker body (2), the spring band (31) has its concave part tightly close to the cooker body (2) so that whenever the saturated steam pressure in the cooker reaches the tension of the spring band (31), the spring band can be pushed upward by the thrust force from the cover (1) and then steam can be released from the gap (3).

FIGS. 8 A, 8 B, 8 C, 8 D and 8 E show a coupling steel ring (3) which is made of elastic steel material. The said coupling steel ring (3) has a semi-closing cross section which has an arch or "[" elastic opening (9). The structure allows the elastic opening (9) be elastic. When the coupling steel ring is attached between the cover (1) and the cooker body (2), and the opening (4) is closed, the coupling steel ring (3) keeps the cover (1) and the cooker body (2) is tightly coupled condition. Elasticity of the opening is considered while designing the opening so that it can resist any pressure lower than the saturated steam pressure. Therefore, whenever the steam pressure in the cooker reaches the predetermined pressure, the cover gives an upward thrust force due to the expansion force and pushes the coupling steel ring (3) upwards, Once the steam pressure excesses the elasticity of the coupling steel ring (3), the opening (4) of the coupling steel ring is opened and steam is released from the cooker through the ring groove (8) and the opening (4) of the coupling steel ring (3), or partly from the elastic opening (9) and the gap at the cover (1). Since both ends of the opening (4) of the coupling steel ring (3) contact each other directly while the opening (4) is at closing condition, then there is an enough gap for releasing steam while the opening (4) is at closing condition. Furthermore, there is also a gap between the elastic opening (9) of the coupling steel ring (3) and the cover (1), a part of the steam can be released from the gap. The invention uses a coupling steel ring (3) for rightly coupling the cover (1) to the cooker body (2). So the steam can be released at the whole periphery of the cooker through the gap (e) of the spring band (31), or the opening (4), and the gap at elastic opening (9) of the coupling steel ring (3). Therefore, there is no risk from the cloging of steam hole, as that used in ordinary pressure cooker. In the using of this invention, whenever the steam pressure in the cooker reaches a certain level, it will keep the pressure constant and then, explosion can be prevented.

I claim:

1. A constant pressure cooker, comprising:
   a cooker body having a protruding edge portion;

a cover having an exterior margin curved inward and under the cover to form a cover groove, the exterior margin being shaped so as to mate with the protruding edge portion of the cooker body when the cover is placed on the cooker body;

a thermal resistant rubber material placed within the cover groove; and a coupling ring having a gap therein and having a cross sectional shape for clamping the protruding edge portion of the cooker body to the exterior margin of the cover and fabricated from a flexible metal material such that for pressures within the cooker below a predetermined threshold, the edge portion of the body is held tightly to the exterior margin of the cover, but for pressures within the cooker at or above the predetermined threshold, the cross-section of the ring deforms and allows the exterior margin of the cover to separate from the edge portion of the cooker body so that pressurized gases can escape from the cooker; and means for adjusting the size of the gap to clamp and unclamp the coupling ring.

2. A constant pressure cooker, comprising:

a cooker body;

a cover;

a substantially circular coupling ring having a gap therein and a cross-section suitable for clamping the cover to the body;

means for adjusting the size of the opening in the coupling ring to thereby loosen or tighten it about the body and cover;

wherein the coupling ring includes a spring band on an upper ring surface thereof, the spring band being directly pressed on the coupling ring, the spring band either (a) having a first end connected to the coupling ring and a second concave end for maintaining an appropriate gap with an upper edge of the coupling ring, or (b) having both ends connected to the coupling ring and having a concave middle portion for maintaining an appropriate gap with an upper edge of the coupling ring.

3. A constant pressure cooker, comprising:

a cooker body;

a cover;

a substantially circuit coupling ring having a gap therein and a cross-section suitable for clamping the cover to the body;

means for adjusting the size of the opening in the coupling ring to thereby loosen or tighten it about the body and cover;

a fixing pin installed on the coupling ring at each end of the opening intended to cooperate with a handle having semicircular grooves for engaging the fixing pins so that the motion of the handle in one direction forces the fixing pins, so engaged, closer to one another thereby reducing the size of the gap in the coupling ring and tightening the coupling ring and motion of the handle in the opposite direction forces the fixing pins so engaged further from one another thereby increasing the size of the gap in the coupling ring and loosening it.

4. A constant pressure cooker comprising:

a cooker body;

a cover;

a substantially circular coupling ring having a gap therein and a cross-section suitable for clamping the cover to the body;

means for adjusting the size of the opening in the coupling ring to thereby loosen or tighten it about the body and cover;

wherein the coupling ring includes a gear driven by an operation lever, for engaging a portion of the ring arranged such that the motion of the operating lever in one direction widens the size of the gap in the coupling ring thereby loosening it and motion in the opposite direction of the operating lever narrows the size of the gap in the coupling ring thereby tightening it, and means for limiting the range of motion of the operation lever.

5. A cooker according to claim 1 wherein the means for adjusting the size of the gap comprises a lever having one end coupled to the ring near one side of the gap and a movable member having a first end coupled to the ring near the other side of the gap and a second end coupled to a central portion of the lever so that operating the lever by moving its free end in one direction reduces the size of the gap and tightens the ring and moving its free end in the opposite direction increases the size of the gap and loosens the ring.

6. A cooker according to claim 1 wherein the coupling steel ring has a generally C-shaped cross section.

7. A cooker according to claim 1 further including a spring band on an upper ring surface of the coupling ring being directly pressed on the coupling steel ring; wherein the spring band has one end connected to the coupling steel ring and another end formed in a concave shape so as to maintain an apropriate gap with the upper edge of the coupling steel ring, or having both ends directly connected to the coupling ring and a middle part of the spring band formed in a concave shape so that an appropriate gap with the upper edge of the coupling steel ring can be maintained.

8. A constant pressure cooker according to claim 2 wherein the spring band is of "L"-like, rectangular or circular or any other shape.

9. A cooker according to claim 1 wherein the coupling ring is made of an elastic steel material and has a semi-closing cross section and an arch, or "L"-like cross-section or any other like elastic opening to provide an elasticity in clamping the cover to the body.

10. A cooker according to claim 1 wherein the means for adjusting comprises a fixing pin installed to the clamping ring at each end of the gap therein to cooperate with grooves of a handle so that the rightward and leftward movement of the handle can change the distance between the two fixing pins for opening and closing the gap of the coupling ring.

11. A cooker according to claim 1 wherein the means for adjusting comprises a gear driven by an operation lever and the leftward and rightward moving of the operation lever can drive the gear to open and close the gap; and further including a position groove at an end of the gap for limiting the range of movement of the operation lever.

12. A cooker according to claim 1 wherein the means for adjusting comprises a movable bar and an operation lever connected so that motion in a first direction and motion in a second direction if the operation can close and open the opening, respectively.

* * * * *